US00RE45692E

(19) United States
(12) Reissued Patent
Yamazaki

(10) Patent Number: US RE45,692 E
(45) Date of Reissued Patent: Sep. 29, 2015

(54) AUTOMATIC FOCUSING APPARATUS AND IMAGE PICKUP APPARATUS

(71) Applicant: Tatsuya Yamazaki, Machida (JP)

(72) Inventor: Tatsuya Yamazaki, Machida (JP)

(73) Assignee: Canon Kabushiki Kaisha, Tokyo (JP)

(21) Appl. No.: 13/869,462

(22) Filed: Apr. 24, 2013

Related U.S. Patent Documents

Reissue of:
(64) Patent No.: 7,932,950
Issued: Apr. 26, 2011
Appl. No.: 11/834,427
Filed: Aug. 6, 2007

(30) Foreign Application Priority Data

Aug. 16, 2006 (JP) ..... 2006-221779

(51) Int. Cl.
*G03B 13/00* (2006.01)
*G03B 3/00* (2006.01)
*G03B 13/36* (2006.01)
*H04N 5/232* (2006.01)
*G02B 7/10* (2006.01)

(52) U.S. Cl.
CPC *G03B 3/00* (2013.01); *G03B 13/36* (2013.01); *H04N 5/23212* (2013.01); *G02B 7/102* (2013.01)

(58) Field of Classification Search
CPC ..... G03B 3/00; G03B 13/36; H04N 5/23212; G02B 7/102
USPC ..... 348/345.48–356; 396/79–82, 93, 121, 396/139
See application file for complete search history.

(56) References Cited

U.S. PATENT DOCUMENTS

| | | | | |
|---|---|---|---|---|
| 5,597,999 | A * | 1/1997 | Kinba et al. | 250/201.7 |
| 5,623,309 | A * | 4/1997 | Yoshimura et al. | 348/355 |
| 5,862,415 | A * | 1/1999 | Matsumoto | 396/55 |
| 6,385,398 | B1 * | 5/2002 | Matsumoto | 396/52 |
| 7,099,575 | B2 * | 8/2006 | Toji | 396/111 |
| 7,512,328 | B2 * | 3/2009 | Suda | 396/52 |
| 2003/0150973 | A1 * | 8/2003 | Misawa | 250/201.4 |
| 2004/0202461 | A1 * | 10/2004 | Nakahara | 396/104 |
| 2005/0083429 | A1 * | 4/2005 | Yasuda | 348/345 |

FOREIGN PATENT DOCUMENTS

JP 5-064056 A 3/1993

* cited by examiner

*Primary Examiner* — Yuzhen Ge
(74) *Attorney, Agent, or Firm* — Canon U.S.A., Inc. IP Division

(57) ABSTRACT

An automatic focusing apparatus performs focusing using a first automatic focusing method in which lens drive control is performed based on a focus signal so that a focus lens is moved to an in-focus point, and a second automatic focusing method in which lens drive control is performed based on information corresponding to an object distance so that the focus lens is moved to an in-focus point. The direction in which the focus lens is moved to the in-focus point according to the second automatic focusing method is compared with the direction in which the focus lens is moved to the in-focus point according to the first automatic focusing method. Based on the result, it is determined whether to perform the lens drive control according to the second automatic focusing method.

7 Claims, 7 Drawing Sheets

AUTOMATIC FOCUSING APPARATUS AND IMAGE PICKUP APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an automatic focusing apparatus that uses different automatic focusing methods and that performs lens drive control for moving a focus lens to the in-focus point, and an image pickup apparatus such as a video camera.

2. Description of the Related Art

In recent years, automatic focusing apparatuses for video cameras have mainly used a method for focusing in which the sharpness (contrast) of an image is detected from the output signal from an image pickup device, the sharpness is referred to as focus evaluation value (focus signal), and the focus lens position is controlled so that the value is maximized. This method is called hill-climbing AF method (hereinafter referred to as contrast AF method).

In general, the level of the high-frequency component of the output signal of the image pickup device extracted by a band-pass filter of a certain band is used as the focus evaluation value in the contrast AF. The reason is that when a normal object image is photographed, as shown in FIG. 7, the focus evaluation value increases with focusing, and the point at which its level is highest is the in-focus point.

AF methods also include an internal ranging phase difference AF method, which is commonly used in silver-halide film single-lens reflex cameras. In this method, a light beam passing through the exit pupil of a photographing lens is split into two light beams, and the light beams are received by a pair of ranging sensors, respectively. The amount of deviation of the signal output according to the amount of received light, that is to say, the amount of relative positional deviation in the beam splitting direction is detected. Thereby, the amount of deviation in the focusing direction of the photographing lens is directly obtained. Therefore, if accumulating operation is performed by the ranging sensors once, the amount and direction of focusing deviation can be obtained, and high-speed focusing operation is possible.

There is another type of phase difference AF method, in which ranging sensors are provided independently from a photographing lens. This method is called external ranging phase difference AF method. In the external ranging phase difference AF method, a light beam received from an object is split into two light beams, and the light beams are received by a pair of ranging sensors, respectively. The amount of deviation of the signal output according to the amount of received light, that is to say, the amount of relative positional deviation in the beam splitting direction is detected. Thereby, the object distance is obtained by triangulation. AF methods using external ranging sensors also include a method in which the propagation velocity is measured using an ultrasonic sensor, and a method commonly used in compact cameras and in which triangulation is performed using infrared sensors. In these methods, information corresponding to the object distance is detected.

There are proposed AF apparatuses such that a focus lens is moved close to the in-focus point by the internal ranging phase difference AF method, for example, and is thereafter driven to the in-focus point by the contrast AF method (see, for example, Japanese Patent Laid-Open No. 5-64056).

In the above known apparatuses, a focus lens is first moved to an in-focus point determined by an AF method other than the contrast AF method. Only when the focus evaluation value is larger than a predetermined amount, the apparatuses change their AF method to the contrast AF method. Drive control to an in-focus point (lens drive control) is then performed by the contrast AF method. The reason of such configuration is that the contrast AF method enables more accurate focusing.

Therefore, the in-focus point according to the contrast AF method usually differs from the in-focus points according to other AF methods in which lens drive control is performed based on information corresponding the object distance, for example, the phase difference AF method. In addition, the image pickup region where focus detection is performed by the contrast AF method does not necessarily correspond to the region on the image pickup screen subject to detection of the phase difference AF method. Therefore, in-focus points for different objects can be calculated in the contrast AF method and the phase difference AF method, respectively.

In the case where the known apparatuses have different in-focus points due to use of a plurality of AF methods, they have the following drawbacks. Although the focus lens has reached the in-focus point according to the contrast AF method, which enables accurate focusing, the focus lens is often carelessly moved to the in-focus point obtained by the phase difference AF method, for example, and thereby a defocus occurs. In addition, a phenomenon called hunting can occur, in which the focus lens reciprocates between the in-focus points obtained in the respective methods. These do not matter in the case of AF apparatuses for a still image, in which recording is not performed during AF operation. However, in the case of AF apparatuses for a moving image, these are problematic because an unnatural motion is recorded.

The focus evaluation value fluctuates significantly and is unstable during a panning operation or when the panning is completed. It is highly likely that the direction of focusing performed by the contrast AF method is wrong, and the in-focus point detected by the phase difference AF method often differs from the in-focus point detected by the contrast AF method. Therefore, the focusing when the panning is completed can take a long time.

SUMMARY OF THE INVENTION

The present invention improves the quality and accuracy of focusing an automatic focusing apparatus that uses different automatic focusing methods and that performs lens drive control for moving a focus lens to the in-focus point, and an image pickup apparatus such as a video camera.

In an aspect of the present invention, an automatic focusing apparatus performs focusing a first automatic focusing method in which a focus signal corresponding to the contrast of an image is obtained from an output signal of an image pickup unit and lens drive control is performed based on the focus signal so that a focus lens is moved to an in-focus point, and a second automatic focusing method in which information corresponding to object distance is obtained and lens drive control is performed based on the information so that the focus lens is moved to an in-focus point. The apparatus includes a first control unit configured to compare the direction in which the focus lens is moved to the in-focus point according to the second automatic focusing method and the direction in which the focus lens is moved to the in-focus point according to the first automatic focusing method and to determine based on the result whether to perform the lens drive control according to the second automatic focusing method, and a second control unit configured to control the driving of the focus lens based on the determination of the first control unit.

In another aspect of the present invention, an automatic focusing apparatus performs focusing a first automatic focusing method in which a focus signal corresponding to the contrast of an image is obtained from an output signal of an image pickup unit and lens drive control is performed based on the focus signal so that a focus lens is moved to an in-focus point, and a second automatic focusing method in which information corresponding to object distance is obtained and lens drive control is performed based on the information so that the focus lens is moved to an in-focus point. The apparatus includes a panning-state-completion detecting unit configured to detect whether or not a panning state is completed, and a control unit configured to determine whether to perform the lens drive control according to the second automatic focusing method depending on whether or not the difference between the information corresponding to object distance and an object distance corresponding to the present focus lens position is greater than a predetermined value when the panning-state-completion detecting unit detects completion of the panning state.

Further features and aspects of the present invention will become apparent from the following description of exemplary embodiments (with reference to the attached drawings).

BRIEF DESCRIPTION OF THE DRAWINGS

FIG. 4A illustrates a vertical synchronizing signal and FIG. 4B illustrates a plot which shows the lens position with regard to a time domain.

DESCRIPTION OF THE EMBODIMENTS

First Exemplary Embodiment

Figure 1:
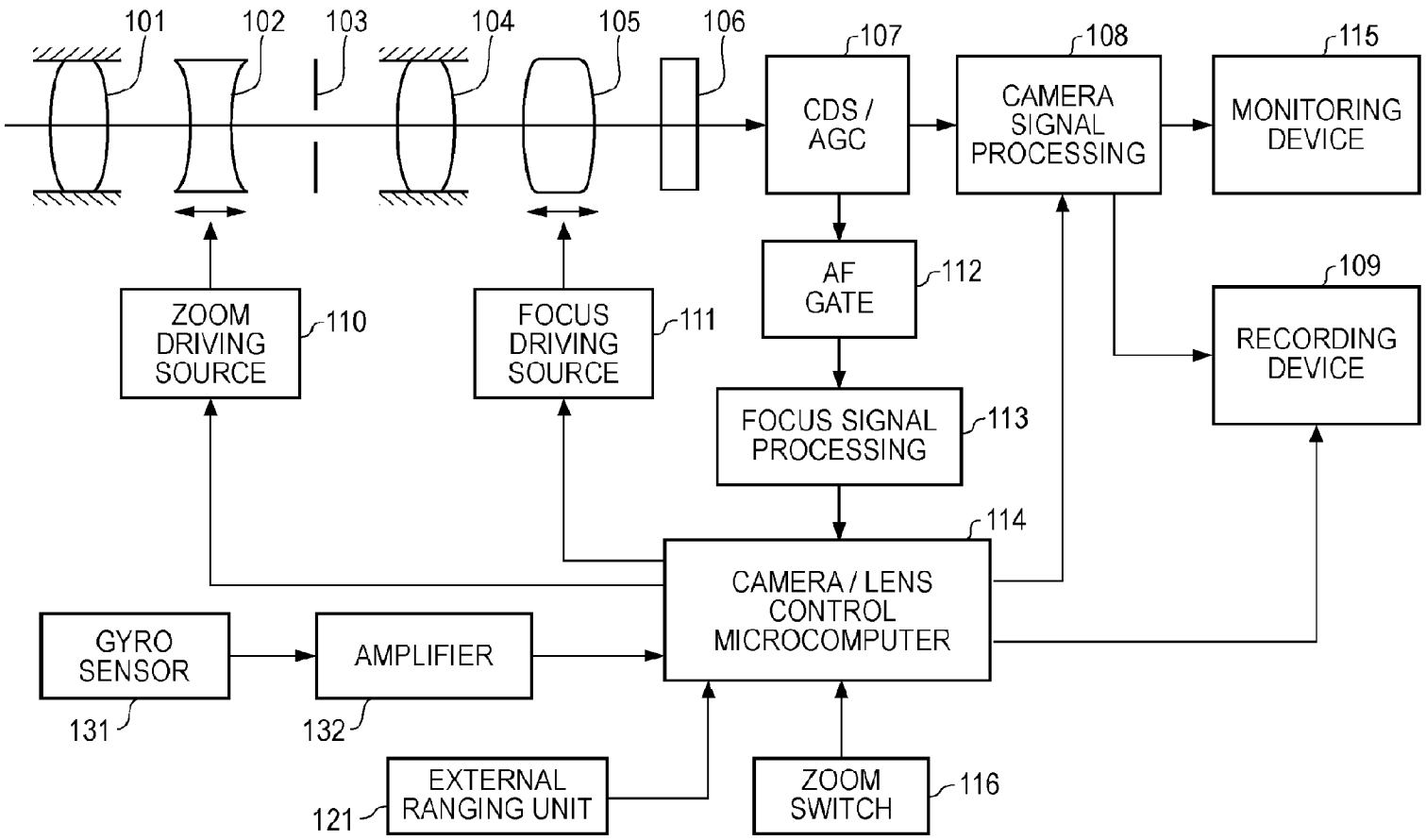
FIG. 1 illustrates an example system configuration of a video camera according to a first embodiment of the present invention.

FIG. 1 illustrates an example system configuration of a video camera according to a first embodiment of the present invention. In FIG. 1, reference numeral 101 denotes a fixed first lens unit, reference numeral 102 denotes a zoom lens, reference numeral 103 denotes a stop, and reference numeral 104 denotes a fixed second lens unit. Reference numeral 105 denotes a focus compensation lens (hereinafter referred to as focus lens), which has a function to correct the movement of the focal plane that accompanies zooming and a function of focusing. Reference numeral 106 denotes an image pickup device such as a CCD sensor. Reference numeral 107 denotes a CDS (Correlated Double Sampling)/AGC (Automatic Gain Control) circuit, which samples the output signal of the image pickup device 106 and adjusts the gain. Reference numeral 108 denotes a camera signal processing circuit, which processes the output signal from the CDS/AGC circuit 107 into a signal corresponding to a below-described recording device 109. Reference numeral 109 denotes a recording device, in which a magnetic tape, an optical disk, a magnetic disk, or a semiconductor memory is used.

Reference numeral 110 denotes a zoom driving source (motor) for moving the zoom lens 102. Reference numeral 111 denotes a focus driving source (motor) for moving the focus lens 105. Reference numeral 112 denotes an AF gate. Of the output signal of the CDS/AGC circuit 107, only a signal in the region used for focus detection is allowed to pass through the AF gate 112. Reference numeral 113 denotes a focus signal processing circuit, which extracts a high-frequency component from the signal that passes through the AF gate 112 and makes it a focus evaluation value (focus signal). Reference numeral 114 denotes a camera/lens control microcomputer. Based on the output signal of the focus signal processing circuit 113, the microcomputer 114 controls the focus driving source 111 to drive the focus lens 105 and outputs an image recording instruction to the recording device 109. Reference numeral 115 denotes a monitoring device, which displays the output signal of the camera signal processing circuit 108 in the form of an image and is used so that a photographer can monitor the image. Reference numeral 116 denotes a zoom switch. When zooming, the photographer operates the zoom switch 116. In response to the operation, the camera/lens control microcomputer 114 controls the zoom lens 102 and the focus lens 105. Reference numeral 121 denotes an external ranging unit, which uses a known method, for example, a phase difference AF method, an ultrasonic sensor method, or an infrared sensor method, and which detects information according to the object distance. In this embodiment, the external ranging unit 121 typically uses the phase difference AF method.

Reference numeral 131 denotes a gyro sensor, which detects a shaken state of the video camera. Reference numeral 132 denotes an amplifier, which amplifies the output signal of the gyro sensor 131. This signal is taken in the camera/lens control microcomputer 114. Based on this signal, image stabilization control is performed. Details of image stabilization control will be omitted. Whether or not a panning is completed can be determined from the output signal of the amplifier 132.

Figure 2:
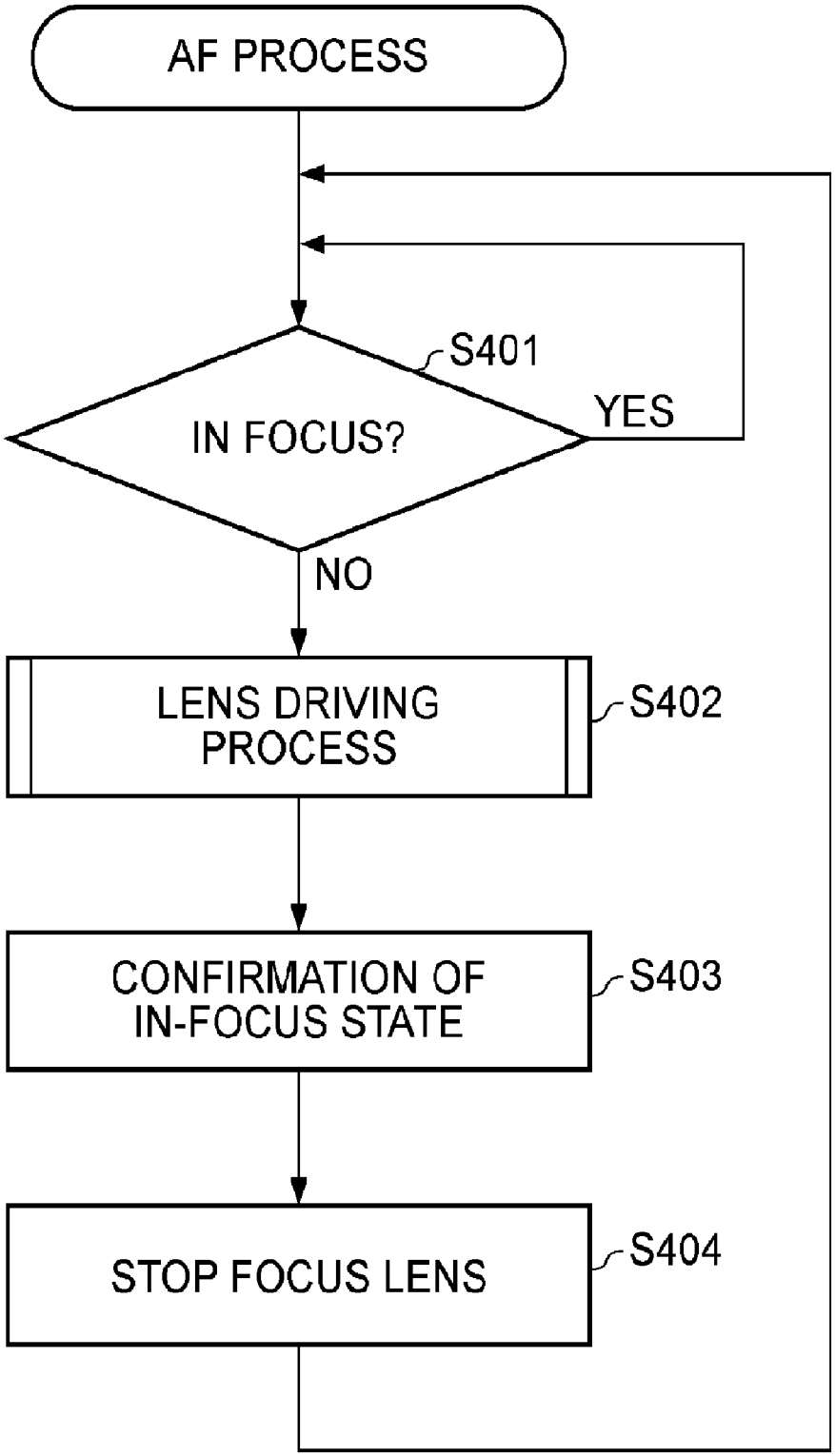
FIG. 2 is a flowchart illustrating an example AF control process in the first embodiment of the present invention.

FIG. 2 is a flowchart illustrating an example operation concerning the AF process in the camera/lens control microcomputer 114. A brief description will be given below with reference to this flowchart.

First, in Step S401, it is confirmed whether or not the focus lens 105 is in an in-focus state. For example, the focus evaluation value when the in-focus determination is performed is compared with the present focus evaluation value. If the difference is greater than or equal to a predetermined value, it is determined that the focus lens 105 is out of focus, and the flow proceeds to Step S402. In Step S402, the drive control of the focus lens 105 is performed by the phase difference AF method and the contrast AF method. Details will be described hereinafter.

After the focus lens 105 is moved to an in-focus point by the lens drive control, the flow proceeds to Step S403, where confirmation of in-focus state is performed. For example, after the lens is moved to an in-focus point by the contrast AF method, the focus lens 105 is slowly reciprocated near the peak position of the focus evaluation value, or driven minutely as described hereinafter. By this operation, it is confirmed whether or not the focus lens is at an in-focus point. If an in-focus state is confirmed, the flow proceeds to Step S404. The focus lens 105 is stopped, and the flow returns to Step S401.

The AF process is realized by repeating the above operation.

Figure 3:
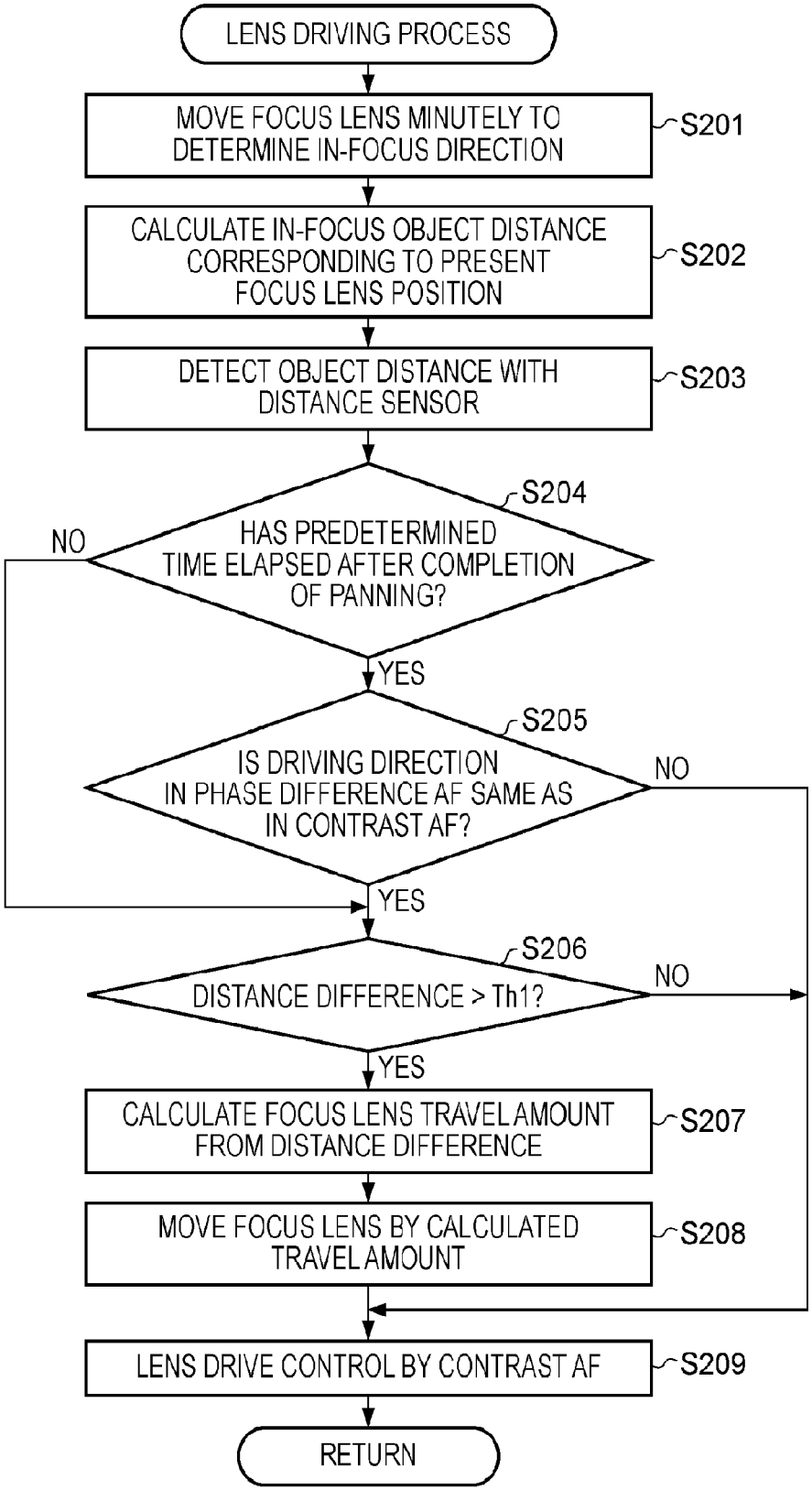
FIG. 3 is a flowchart illustrating an example lens driving process in the first embodiment of the present invention.

FIG. 3 is a flowchart illustrating the lens driving process performed in the Step S402. Detailed description will be given below with reference to this flowchart.

First, in Step S201, the focus lens 105 is driven minutely to determine the in-focus direction. This minute driving will be described with reference to FIGS. 4A and 4B.

Figure 4A:
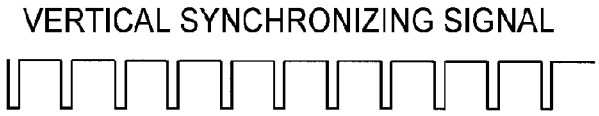
FIGS. 4A and 4B illustrate the minute driving in the first embodiment of the present invention; and in particular.
Figure 4B:
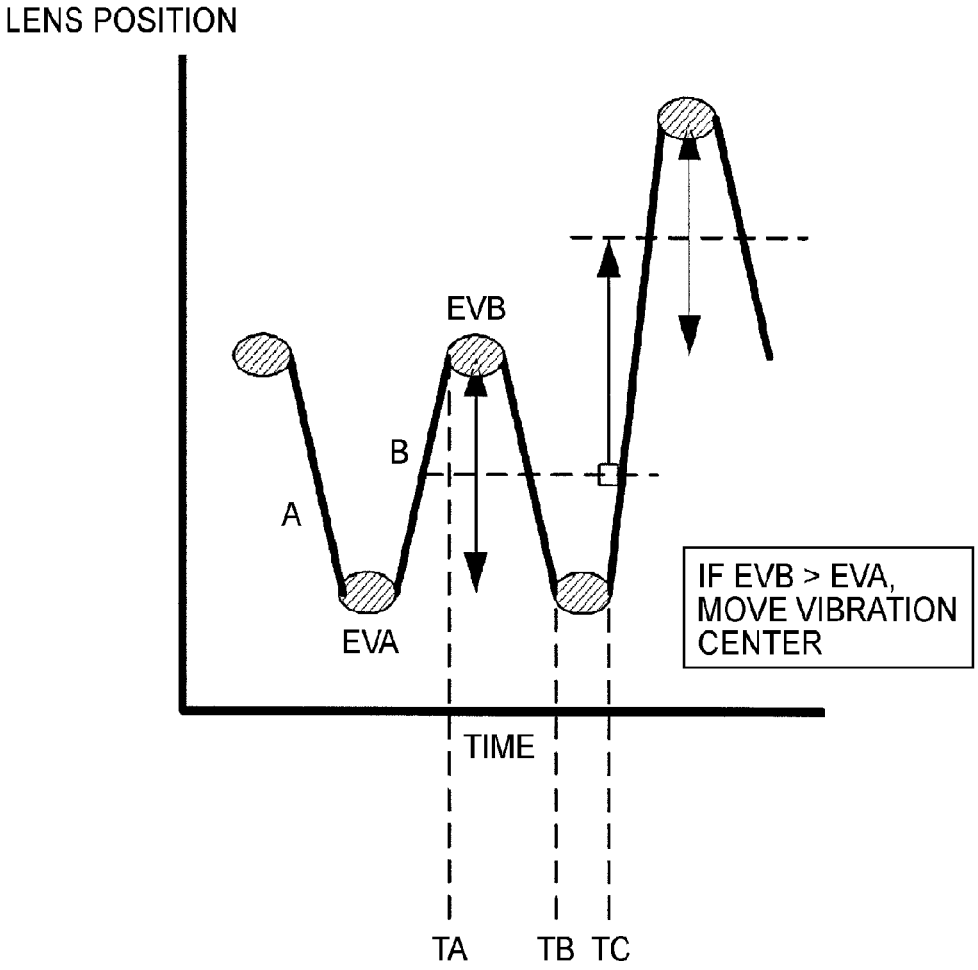

FIG. 4B illustrates the movement of the focus lens 105 during the minute driving. The horizontal axis represents time, and the vertical axis represents the position of the focus lens 105 (lens position). FIG. 4A illustrates a vertical synchronizing signal of the output signal (image signal) of the image pickup device 106.

In FIG. 4B, a focus evaluation value EVA to the charge (shaded ellipse) accumulated in the image pickup device 106 during A is taken in at time TA synchronized with the vertical synchronizing signal. A focus evaluation value EVB to the charge (shaded ellipse) accumulated in the image pickup device 106 during B is taken in at time TB. At time TC, the focus evaluation value EVA and the focus evaluation value EVB are compared. If EVB>EVA, the vibration center is moved (driving amplitude=vibration amplitude+center moving amplitude). If EVA>EVB, the vibration center is not moved (driving amplitude=vibration amplitude). If the vibration center is moved to the same direction predetermined times in succession, it is determined that the direction is the in-focus direction. If a peak of the focus evaluation value is detected by this operation, it can be determined that the peak is an in-focus point.

Attention will now be returned to FIG. 3. After the in-focus direction is determined in Step S201, the flow proceeds to Step S202, where the object distance corresponding to the present position of the focus lens 105 is calculated. Next, in Step S203, the object distance is detected with the distance sensor. Steps S202 and S203 determine the lens driving direction for focusing on the object.

Next, in Step S204, it is determined whether or not a panning is completed. The output of the gyro sensor 131 during panning will be described with reference to FIG. 5.

Figure 5:
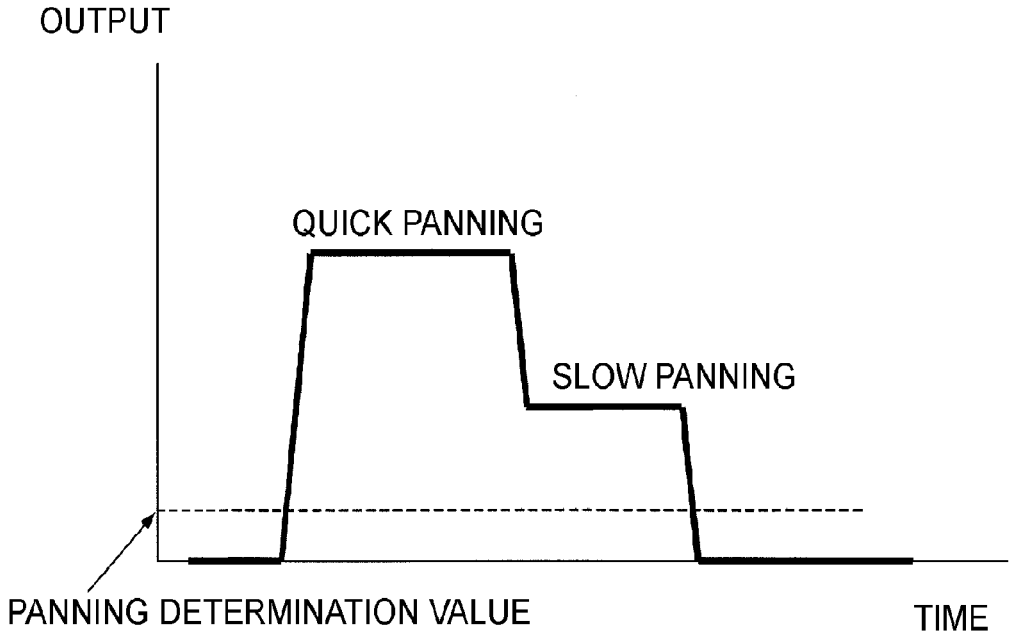
FIG. 5 illustrates an example output of a gyro sensor before and after panning in the first embodiment of the present invention.

FIG. 5 illustrates the output of the gyro sensor 131 during panning. The horizontal axis represents time, and the vertical axis represents the output of the gyro sensor. The output of the gyro sensor is positive or negative depending on the direction of panning. FIG. 5 illustrates the output in the case where a panning is performed so that the output is positive. When the video camera is held in photographer's hand, the frequency component of camera shake is superposed on the signal shown in FIG. 5. However, the camera shake signal is removed to make the description easy to understand.

The gyro sensor 131 is an angular velocity detecting sensor. The output appears during panning and becomes almost zero when the panning is completed. When the panning is quick, the output is large. When the panning is slow, the output is small. By using this output, the completion of panning can be determined. For example, a panning determination value shown in FIG. 5 is set. When the output falls below this panning determination value, it can be determined that the panning is completed.

Attention will be again returned to FIG. 3. If a predetermined time has [not] elapsed in Step S204, the flow proceeds to Step S205. In Step S205, it is determined whether or not the in-focus focus lens position (in-focus point) according to the phase difference AF is in the same direction from the present focus lens position as the direction in which the focus lens 105 is moved by the contrast AF. If the in-focus focus lens position is in the same direction, the flow proceeds to Step S206. In Step S206, it is determined whether or not the difference between the object distance corresponding to the present focus lens position and the object distance corresponding to the phase difference detected by the phase difference AF is greater than a predetermined value Th1. If the difference in object distance is greater than Th1, the flow proceeds to Step S207, where a travel amount of the focus lens 105 corresponding to the object distance is calculated. Next, in Step S208, the focus lens 105 is moved by the calculated travel amount. After completion of movement of the focus lens 105, the flow proceeds to Step S209, where the lens drive control by the contrast AF is performed to drive the focus lens 105 into the in-focus point. The reason is that the in-focus accuracy of the contrast AF is higher than that of the phase difference AF as described above.

If it is determined that the in-focus focus lens position is not in the same direction in Step S205, the focus lens is not moved to the in-focus focus lens position by the phase difference AF, and the lens drive control by the contrast AF is performed in Step S209. Also in the case where the difference between the object distance corresponding to the present focus lens position and the object distance corresponding to the phase difference detected by the phase difference AF is not greater than the predetermined value Th1 in Step S206, the focus lens is not moved to the in-focus focus lens position by the phase difference AF, and the lens drive control by the contrast AF is performed in Step S209.

As described above, based on the result of comparing the moving direction to the in-focus focus lens position according to the phase difference AF and the direction in which the focus lens is driven in the lens drive control by the contrast AF, the focusing operation (whether to move the focus lens to the in-focus focus lens position according to the phase difference AF) is changed. This can prevent the focus lens from being carelessly moved to the in-focus focus lens position according to the phase difference AF, and can prevent the AF operation leading to the blur of an image or hunting.

If it is determined that the predetermined time has not elapsed after completion of panning in Step S204, the process of Step S205 is skipped. If there is no difference between the object distance corresponding to the present focus lens position and the object distance corresponding to the phase difference detected by the phase difference AF, the lens drive control by the contrast AF is immediately performed. However, if there is a distance difference, that is to say, if the focus lens is significantly defocused after panning, the lens drive control to the in-focus point detected by the phase difference AF is performed in Steps S207 and S208. In the case where there is no distance difference, a high-quality focusing operation can be performed by the contrast AF. In the case of a significantly defocused state in which it is considered that the focus evaluation value includes a large error due to panning, high-speed focusing operation by the phase difference AF can be performed.

In the above first embodiment, the determination of panning is performed based on the output signal of the gyro sensor 131. However, the present invention is not limited to this. The same advantages can be achieved with any sensor, for example, an acceleration sensor as long as it can detect the completion of panning.

The completion of panning can also be detected from the focus evaluation value. Since the image moves during panning, the focus evaluation value that passes through the AF gate 112 is substantially uniform. However, since the image stops after completion of panning, a difference in level occurs in the focus evaluation value. By detecting this difference in level, the completion of panning can be detected. By using this information, the same advantages can be obtained.

In the above first embodiment, based on the result of comparing the moving direction to the in-focus focus lens position according to the phase difference AF and the direction in which the focus lens 105 is driven by the contrast AF, it is determined whether to move the focus lens to the in-focus focus lens position according to the phase difference AF. This can prevent the focus lens from being carelessly moved to the in-focus focus lens position according to the phase difference AF, and can prevent the AF operation leading to the blur of an image or hunting.

When the panning is completed, if the focus lens is significantly defocused, the focus lens is moved to the in-focus point according to the phase difference AF. Thereby, the focusing speed after panning can be increased even if the focus evaluation value is unstable due to panning.

Second Exemplary Embodiment

Figure 6:
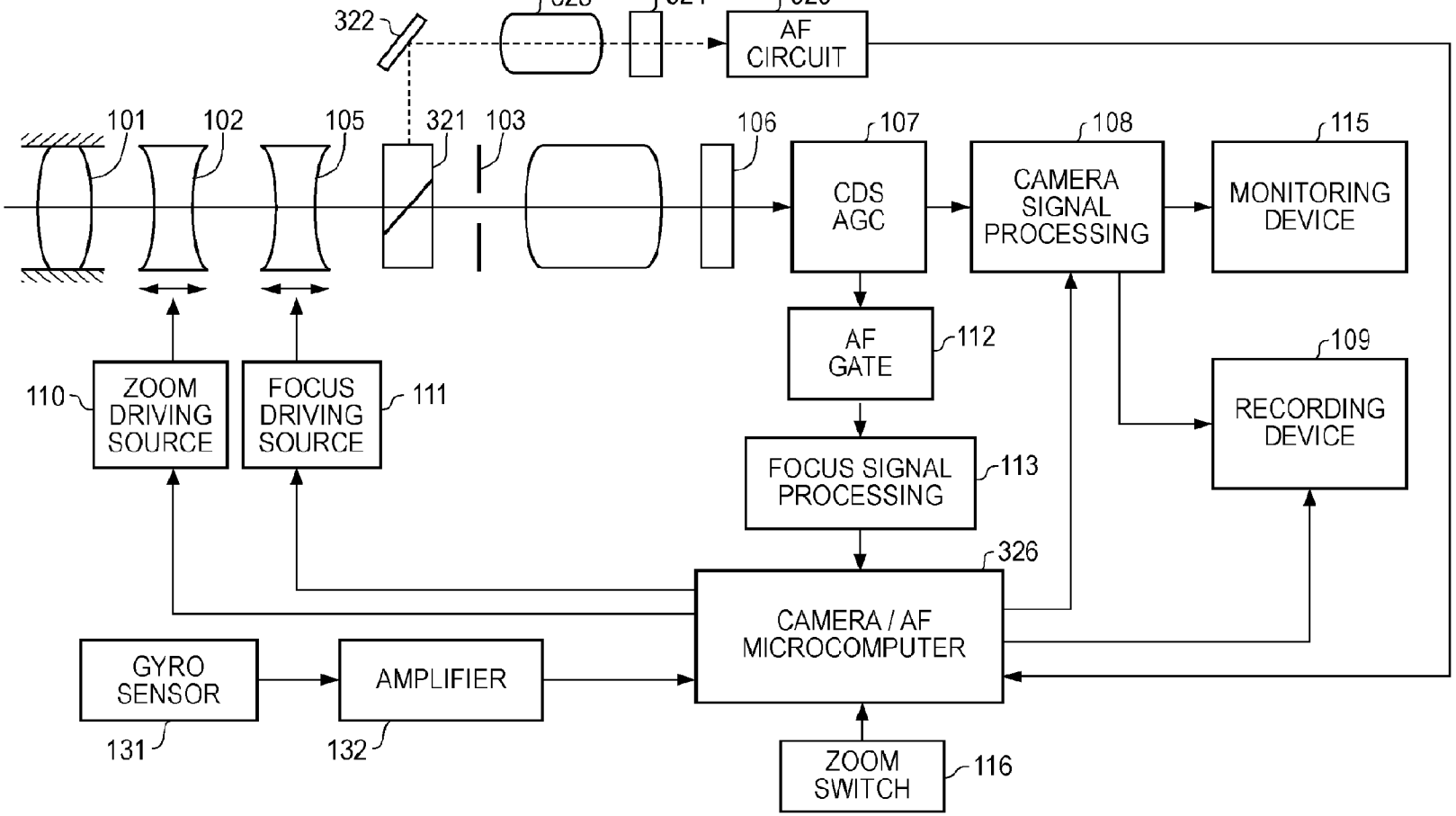
FIG. 6 illustrates an example system configuration of an image pickup apparatus according to a second embodiment of the present invention.
Figure 7:
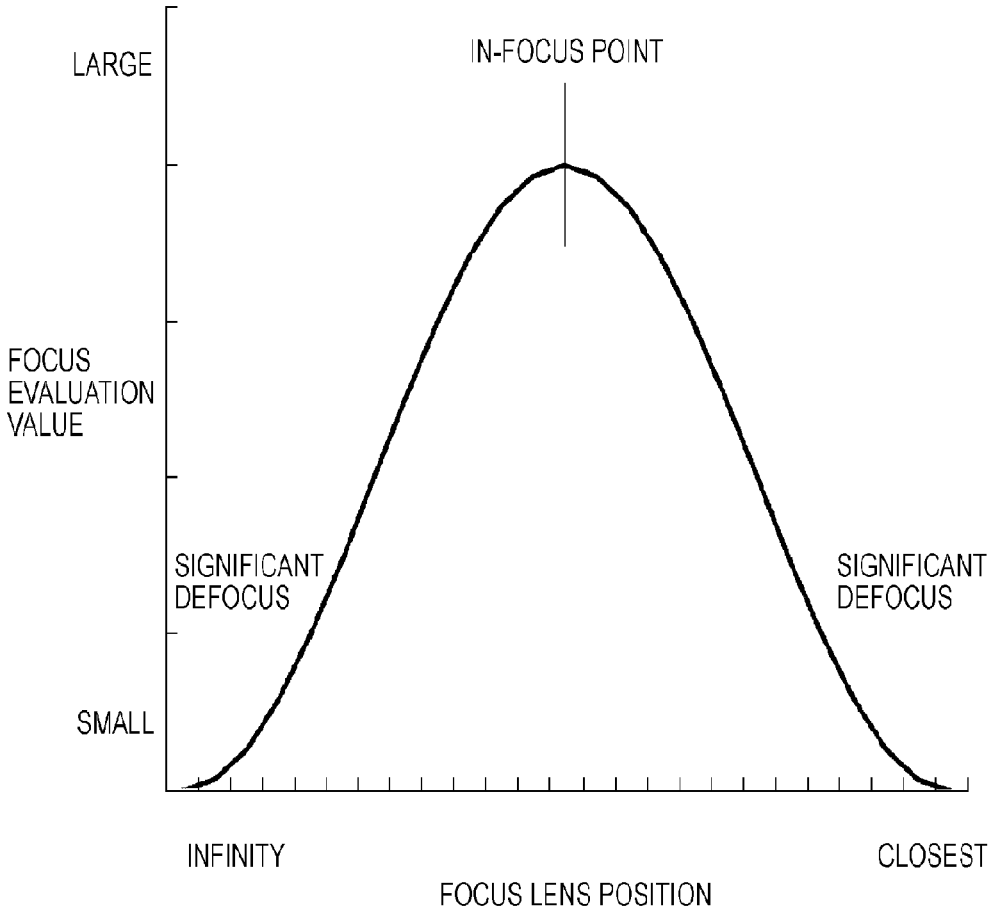
FIG. 7 (PRIOR ART)
FIG. 7 illustrates the relationship between focus lens position and the focus evaluation value.

FIG. 6 illustrates the system configuration of an image pickup apparatus according to a second embodiment of the present invention. In the description of the second embodiment, the same reference numerals will be used to designate the same components as those in the first embodiment, so that the description thereof will be omitted.

An external ranging unit 121 is used in the first embodiment, whereas a TTL (through-the-lens) phase difference AF method is used in the second embodiment of the present invention.

In FIG. 6, reference numeral 321 denotes a half prism, which splits light for automatic focusing. Reference numeral 322 denotes a submirror, and reference numeral 323 denotes an imaging lens for AF. Reference numeral 324 denotes an AF sensor for the phase difference AF, and reference numeral 325 denotes an AF circuit. Reference numeral 326 denotes a camera/AF microcomputer, which detects the amount and direction of deviation from the output of the AF sensor 324 via the AF circuit 325.

In the case of an image pickup apparatus of such a configuration, the stop 103 is in operation during photographing of a moving image. Therefore, the input light needs to be split before the stop 103 by the half prism 321.

Instead of the external ranging method in the first embodiment, the internal ranging phase difference AF method is used for ranging an object in the second embodiment of the present invention. The AF control algorithm described in the first embodiment can be applied to the second embodiment.

Based on the result of comparing the moving direction to the in-focus focus lens position according to the internal ranging phase difference AF and the direction in which the focus lens 105 is driven by the contrast AF method, it is determined whether to move the focus lens to the in-focus focus lens position according to the phase difference AF. After panning, by moving the focus lens 105 to the in-focus point according to the phase difference AF, the same advantages as the first embodiment can be obtained.

According to the first and second embodiments, when the driving direction of an AF that performs lens drive control based on the information corresponding to the object distance, for example, the phase difference AF is the same as the driving direction of the contrast AF, the lens drive control by the phase difference AF is performed. Therefore, the accuracy and quality of focusing can be improved.

Within a predetermined time after completion of panning, by driving the focus lens by the phase difference AF, faster focusing is possible even after panning, when the focus evaluation value is unstable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-221779 filed Aug. 16, 2006, which is hereby incorporated by reference herein in its entirety.

What is claimed is:

[1. An image taking apparatus configured to perform focusing a first automatic focusing method in which a focus signal corresponding to the contrast of an image is obtained from an output signal of an image pickup unit and lens drive control is performed based on the focus signal so that a focus lens is moved to an in-focus point, and a second automatic focusing method in which information corresponding to object distance is obtained and lens drive control is performed based on the information so that the focus lens is moved to an in-focus point, the apparatus comprising:

a panning-state-completion detecting unit configured to detect whether or not a panning state of the image taking apparatus is completed; and a control unit configured to execute the lens drive control according to the second automatic focusing method in case where a moving direction of the focus lens according to the first automatic focusing method and the moving direction of the focus lens which corresponds to the object distance matches and also satisfying a predetermined condition in condition at a first time after completing the panning-state, and to execute the lens drive control according to the second automatic focusing method in case where satisfying the predetermined condition depending on whether or not the moving direction of the focus lens according to the first automatic focusing method and the moving direction of the focus lens which corresponds to the object distance matches in condition at a second time which is shorter than the first time after completing the panning-state.]

[2. The automatic focusing apparatus according to claim 1, wherein the control unit performs the lens drive control according to the second automatic focusing method and thereafter performs the lens drive control according to the first automatic focusing method when the difference between the information corresponding to object distance and the object distance corresponding to the present focus lens position is greater than the predetermined value.]

[3. The automatic focusing apparatus according to claim 2, wherein the control unit performs the lens drive control according to the first automatic focusing method without performing the lens drive control according to the second automatic focusing method when the difference between the information corresponding to object distance and the object distance corresponding to the present focus lens position is less than or equal to the predetermined value.]

[4. An image pickup apparatus having an automatic focusing apparatus configured to perform focusing a first automatic focusing method in which a focus signal corresponding to the contrast of an image is obtained from an output signal of an image pickup unit and lens drive control is performed based on the focus signal so that a focus lens is moved to an in-focus point, and a second automatic focusing method in which information corresponding to object distance is obtained and lens drive control is performed based on the information so that the focus lens is moved to an in-focus point, the image pickup apparatus comprising:

an automatic focusing apparatus including, a panning-state-completion detecting unit configured to detect whether or not a panning state is completed; and a control unit configured to execute the lens drive control according to the second automatic focusing method in case where a moving direction of the focus lens according to the first automatic focusing method and the moving direction of the focus lens which corresponds to the object distance matches and also satisfying a predetermined condition in condition at a first time after completing the panning-state, and to execute the lens drive control according to the second automatic focusing method in case where satisfying the predetermined condition depending on whether or not the moving direction of the focus lens according to the first automatic focusing method and the moving direction of the focus lens which corresponds to the object distance matches in condition at a second time which is shorter than the first time after completing the panning-state.]

*5. An image taking apparatus configured to perform focusing using a first automatic focusing method in which a first focus signal corresponding to the contrast of an image is obtained from an output signal of an image pickup unit and lens drive control is performed based on the first focus signal so that a focus lens is moved to an in-focus point, and a second automatic focusing method in which a second focus signal corresponding to object distance is obtained and lens drive control is performed based on the second focus signal so that the focus lens is moved to an in-focus point, the image taking apparatus comprising:*

*a first determining unit configured to determine whether a predetermined time has elapsed after completion of the panning of the image taking apparatus;*

*a second determining unit configured to determine whether a first moving direction of the focus lens according to the first focus signal is same as a second moving direction of the focus lens according to the second focus signal;*

*a third determining unit configured to determine whether a predetermined condition is satisfied; and*

*a control unit configured to*

*perform lens drive control based on the first and second focus signals in response to a determination result that the first moving direction is same as the second moving direction and a determination result that the predetermined condition has been satisfied in a case where it is determined that the predetermined time has elapsed after the completion of the panning, and*

*perform lens drive control based on the first and second focus signals in response to a determination result that the predetermined condition has been satisfied regardless of whether the first moving direction is same as the second moving direction in a case where it is determined that the predetermined time has not elapsed after the completion of the panning.*

*6. The image taking apparatus according to claim 5, wherein the difference between the object distance corresponding to the second focus signal obtained by the second automatic focusing method and the object distance corresponding to a current position of the focus lens is compared with a threshold to determine whether the predetermined condition is satisfied.*

*7. The image taking apparatus according to claim 5, wherein the first determining unit, the second determining unit, and the third determining unit are comprised with a microcomputer.*

*8. An image taking method performed by an image taking apparatus configured to perform focusing using a first automatic focusing method in which a first focus signal corresponding to the contrast of an image is obtained from an output signal of an image pickup unit and lens drive control is performed based on the first focus signal so that a focus lens is moved to an in-focus point, and a second automatic focusing method in which a second focus signal corresponding to object distance is obtained and lens drive control is performed based on the second focus signal so that the focus lens is moved to an in-focus point, the image taking method comprising:*

*determining whether a predetermined time has elapsed after completion of the panning of the image taking apparatus;*

*determining whether a first moving direction of the focus lens according to the first focus signal is same as a second moving direction of the focus lens according to the second focus signal when it is determined that the predetermined time has elapsed after completion of the panning of the image taking apparatus;*

*determining whether a predetermined condition is satisfied in a case that it is determined that the first moving direction of the focus lens according to the first focus signal is same as the second moving direction of the focus lens according to the second focus signal and in a case that it is determined that the predetermined time has not elapsed after completion of the panning of the image taking apparatus;*

*performing lens drive control based on the first and second focus signals in response to a determination result that the first moving direction is same as the second moving direction and a determination result that the predetermined condition has been satisfied in a case where it is determined that the predetermined time has elapsed after the completion of the panning; and*

*performing lens drive control based on the first and second focus signals in response to a determination result that the predetermined condition has been satisfied regardless of whether the first moving direction is same as the second moving direction in a case where it is determined that the predetermined time has not elapsed after the completion of the panning.*

*9. The image taking method according to claim 8, wherein the difference between the object distance corresponding to the second focus signal obtained by the second automatic focusing method and the object distance corresponding to a current position of the focus lens is compared with a threshold to determine whether the predetermined condition is satisfied.*

*10. A computer-readable medium having stored thereon instructions for performing an image taking method by an image taking apparatus configured to perform focusing using a first automatic focusing method in which a first focus signal corresponding to the contrast of an image is obtained from an output signal of an image pickup unit and lens drive control is*

*performed based on the first focus signal so that a focus lens is moved to an in-focus point, and a second automatic focusing method in which a second focus signal corresponding to object distance is obtained and lens drive control is performed based on the second focus signal so that the focus lens is moved to an in-focus point, the image taking method comprising:*

*determining whether a predetermined time has elapsed after completion of the panning of the image taking apparatus;*

*determining whether a first moving direction of the focus lens according to the first focus signal is same as a second moving direction of the focus lens according to the second focus signal when it is determined that the predetermined time has elapsed after completion of the panning of the image taking apparatus;*

*determining whether a predetermined condition is satisfied in a case that it is determined that the first moving direction of the focus lens according to the first focus signal is same as the second moving direction of the focus lens according to the second focus signal and in a case that it is determined that the predetermined time has not elapsed after completion of the panning of the image taking apparatus;*

*performing lens drive control based on the first and second focus signals in response to a determination result that the first moving direction is same as the second moving direction and a determination result that the predetermined condition has been satisfied in a case where it is determined that the predetermined time has elapsed after the completion of the panning; and*

*performing lens drive control based on the first and second focus signals in response to a determination result that the predetermined condition has been satisfied regardless of whether the first moving direction is same as the second moving direction in a case where it is determined that the predetermined time has not elapsed after the completion of the panning.*

*11. The computer-readable medium according to claim 10, wherein the difference between the object distance corresponding to the second focus signal obtained by the second automatic focusing method and the object distance corresponding to a current position of the focus lens is compared with a threshold to determine whether the predetermined condition is satisfied.*

* * * * *